(12) United States Patent
Akamatsu

(10) Patent No.: US 9,810,870 B2
(45) Date of Patent: Nov. 7, 2017

(54) OPTICAL FIBER TERMINAL FIXING TOOL FOR WINDING OPTICAL FIBER AND OPTICAL FIBER WINDING METHOD

(71) Applicant: FUJIKURA LTD., Koto-ku, Tokyo (JP)

(72) Inventor: Tsuyoshi Akamatsu, Sakura (JP)

(73) Assignee: FUJIKURA LTD., Koto-ku, Tokyo (JP)

( * ) Notice: Subject to any disclaimer, the term of this patent is extended or adjusted under 35 U.S.C. 154(b) by 647 days.

(21) Appl. No.: 14/319,532

(22) Filed: Jun. 30, 2014

(65) Prior Publication Data
US 2015/0008275 A1    Jan. 8, 2015

(30) Foreign Application Priority Data
Jul. 2, 2013    (JP) ................. 2013-138935

(51) Int. Cl.
G02B 6/44    (2006.01)
B65H 65/00   (2006.01)

(52) U.S. Cl.
CPC ........... *G02B 6/4457* (2013.01); *B65H 65/00* (2013.01); *B65H 2701/32* (2013.01)

(58) Field of Classification Search
CPC ...... B65H 54/34; B65H 54/343; B65H 65/00; B65H 75/28; B65H 2701/32; G02B 6/3616; G02B 6/4458; G02B 6/4457
See application file for complete search history.

(56) References Cited

U.S. PATENT DOCUMENTS 6,666,398 B2 * 12/2003 Allegretto .............. B65H 54/70
242/476.4

FOREIGN PATENT DOCUMENTS

| CN | 1073150 A | 6/1993 |
|---|---|---|
| CN | 201376816 Y | 1/2010 |
| CN | 102471007 A | 5/2012 |
| JP | 5623174 A | 3/1981 |
| JP | 61267668 A | 11/1986 |
| JP | 2000-072329 A | 3/2000 |

OTHER PUBLICATIONS

English translation of JP 61-267668.*
Communication dated May 3, 2016, from the State Intellectual Property Office of People's Republic of China in counterpart application No. 201410306874.X.
Communication dated Aug. 4, 2015 from the Japanese Patent Office in counterpart application No. 2013-138935.
(Continued)

*Primary Examiner* — William E Dondero
*Assistant Examiner* — Nathaniel Adams
(74) *Attorney, Agent, or Firm* — Sughrue Mion, PLLC

(57) ABSTRACT

An optical fiber terminal fixing tool includes: a disc-shaped substrate having a plate surface; a holding surface which is provided on the plate surface and interposes the terminal portion of the optical fiber between the holding surface and the first flange portion; and a protrusion which continues in a circumferential direction with a larger diameter than an outer diameter of the first flange portion in an outer circumferential portion on the plate surface while protruding toward the bobbin in a state where the fixing tool is mounted on the rotating shaft of the optical fiber winding machine.

7 Claims, 14 Drawing Sheets

(56) References Cited

OTHER PUBLICATIONS

Communication dated Apr. 7, 2015 from the Japanese Patent Office in counterpart application No. 2013-138935.
Notice of Allowance dated Apr. 28, 2017 issued by the State Intellectual Property Office of People's Republic of China in counterpart application No. 201410306874.X.

* cited by examiner

Prior Art

Prior Art

OPTICAL FIBER TERMINAL FIXING TOOL FOR WINDING OPTICAL FIBER AND OPTICAL FIBER WINDING METHOD

BACKGROUND OF THE INVENTION

Field of the Invention

The present invention relates to an optical fiber terminal fixing tool for fixing a winding start end of an optical fiber to a bobbin and a method for winding the optical fiber on the bobbin using the fixing tool at the time of winding start when the optical fiber is wound around a winding portion between flange portions of the optical fiber winding bobbin having the flange portion. Particularly, the present invention relates to an optical fiber terminal fixing tool suitable for introducing an optical fiber having a terminal fixed to a bobbin to a winding portion, and a winding method using the fixing tool.

Priority is claimed on Japanese Patent Application No. 2013-138935, filed on Jul. 2, 2013, the content of which is incorporated herein by reference.

Description of Related Art

In a manufacturing method for an optical fiber wire, a manufacturing method for an optical fiber core wire, or the like, the optical fiber wire or the optical fiber core wire is wound around a bobbin. Moreover, hereinafter, the optical fiber wire and the optical fiber core wire are collectively referred to as an optical fiber. As the bobbin, a bobbin in which flange portions are provided on both ends of a winding portion (a so-called winding drum) having a cylindrical shape is used. Generally, first, the bobbin is mounted on a winding machine, and a tip portion of the optical fiber to be wound is fixed to the bobbin or a portion which is integrally rotated with the bobbin. Moreover, the bobbin is rotated while tension (winding tension) is applied to the optical fiber, and thus, the optical fiber is wound around an outer circumferential surface of the winding portion (winding drum) between flange portions.

Here, when the winding of the optical fiber starts, as described above, it is necessary to fix the tip portion of the optical fiber to be wound to the bobbin or the portion which is integrally rotated with the bobbin. In this case, generally, the tip portion of the optical fiber is inserted between an outer surface of the flange portion of one end side of the bobbin and a surface of the winding machine side opposing the outer surface. In this case, a terminal of the optical fiber is fixed to the outer surface side of the flange portion. Accordingly, in order to wind the optical fiber around the winding portion inside the flange portion, at the beginning of winding start, the optical fiber needs to cross over the flange portion from the outer surface side of the flange portion and to drop on (i.e., to be introduced to) the outer circumferential surface of the inner winding portion.

In this way, as a method which fixes the terminal of the optical fiber to the outer surface side of the flange portion and introduces the optical fiber to the outer circumferential surface of the winding portion inside the flange portion, particularly, as a method for automatically performing the introduction, for example, a method disclosed in Japanese Unexamined Patent Application, First Publication No. 2000-72329 is widely adopted. The method of the related art is schematically shown in FIGS. 21 to 23.

In FIGS. 21 and 22, in a bobbin 1, flange portions 5A and 5B having larger diameters than an outer diameter of a winding drum 3 are formed on both ends in an axial direction of the winding drum (winding portion) 3 having a cylindrical shape. Meanwhile, a disc-shaped fixed plate 9 which is integrally rotated with a rotating shaft 7 is provided on the rotating shaft 7 of the winding machine. Moreover, the bobbin 1 is mounted on the rotating shaft 7 of the winding machine so that the plate surface of the fixed plate 9 and the outer surface of the flange portion 5A oppose each other. Meanwhile, an optical fiber 11 is supplied to the bobbin 1 via a guide roller 13 such as a traverser. Moreover, in a step before the winding starts (before the bobbin is rotated), a tip portion of the optical fiber 11 to be wound is interposed so as to be fixed between the fixed plate 9 and the flange portion 5A. Moreover, a lateral movement member 15 for regulating a traveling position of the optical fiber 11 supplied from the guide roller 13 of the traverser to the bobbin 1 is disposed in the vicinity of the outer circumference of the flange portion 5A. In an initial step, the lateral movement member 15 moves toward the other flange portion 5B in parallel with a rotation axis of the bobbin 1. Accordingly, the optical fiber 11 crosses over the flange portion 5A and drops on the outer circumference of the winding drum 3. Moreover, as shown in FIG. 23, an introduction groove 17, which is notched from the outer circumferential edge of the flange portion 5A to the inner side, is formed on the outer circumferential portion of the flange portion 5A. If the bobbin 1 is rotated, the optical fiber 11 laterally moved by the lateral movement member 15 is caught on the introduction groove 17 at a boundary portion between an outer circumferential edge surface 5Aa of the flange portion 5A and a bottom surface of the introduction groove 17. Thereafter, the bobbin 1 is further rotated, and thus, the optical fiber 11 can drop on the outer circumferential surface of the winding drum 3 inside the flange portion 5A from the introduction groove 17.

In addition, in a manufacturing process or the like of the optical fiber, a bobbin 20 shown in FIG. 24 may be used. In the bobbin 20, a first winding portion (hereinafter, referred to as a narrow width winding portion, and generally, a width W1 is approximately several millimeters) 21 having a cylindrical shape in which the width W1 in a direction along the rotation axis is very narrow and short, and a second winding portion (hereinafter, referred to as a wide width winding portion, and generally, a width W2 is tens of millimeters or more) 23 having a cylindrical shape in which the width W2 in the direction along the rotation axis is considerably wider than the width W1 of the narrow width winding portion 21 are formed so as to be integrated in series with an intermediate flange portion 25B as a boundary. That is, the narrow width winding portion 21 is formed between a first flange portion 25A positioned at one end side (one end side in the direction along the rotation axis) of the entire bobbin 20 and the intermediate flange portion (second flange portion) 25B, and the wide width winding portion 23 is formed between a third flange portion 25C positioned at the other end side of the entire bobbin 20 and the intermediate flange portion (second flange portion) 25B. Moreover, a diameter d1 of the first flange portion 25A outside the narrow width winding portion 21 is smaller than diameters d2 of both flange portions (the second flange portion (the intermediate flange portion) 25B and the third outer flange portion 25C) of the wide width winding portion 21.

Generally, the narrow width winding portion 21 of the bobbin 20 is used to wind a portion for measuring characteristics of the optical fiber. That is, a portion (approximately several meters) of the terminal side of the optical fiber is wound around the narrow width winding portion 21 at the initial step after the winding starts, and thereafter, most of the remaining optical fiber is wound longer around the wide width winding portion 23. In addition, generally, in order to perform the characteristic measurement of the optical fiber wound around the bobbin, the portion wound around the narrow width winding portion 21 is used.

As described above, when the optical fiber is wound around the winding portion 21 having a very narrow width, in the case where the method of the related art shown in FIGS. 21 to 23 is applied, for practical purposes, in most cases, the winding is difficult. The reason will be described with reference to FIG. 25.

When the lateral movement member 15 positioned at the outer circumferential side of the second flange portion (intermediate flange portion) 25B having a larger diameter is moved in a direction of an arrow 26 and the optical fiber 11 is pressed by the lateral movement member 15, before the optical fiber 11 crosses over the first flange portion 25A in order to be shifted (before an angle of the optical fiber 11 with respect to the first flange portion 25A is a certain value), the optical fiber 11 abuts a corner (a circle portion 24 in FIG. 25) of the second flange portion 25B. Accordingly, the angle of the optical fiber 11 with respect to the first flange portion 25A cannot be changed, and thus, the optical fiber 11 cannot drop into the narrow width winding portion 21 between the first outer flange portion 25A and the second intermediate flange portion 25B.

Therefore, in the winding of the optical fiber 11 on the narrow width winding portion 21 using the bobbin 20 having the narrow width winding portion 21 shown in FIG. 24, manual operation is necessary. In particular, the terminal of the optical fiber 11 is manually introduced to the narrow width winding portion 21 through a through hole (not shown) for guiding the fiber which is formed on a base end portion of the first flange portion 25A, and thus, the optical fiber 11 is wound around the narrow width winding portion 23. Thereafter, the terminal of the optical fiber 11 is fixed. That is, although the fixing operation of the terminal of the optical fiber 11 and the winding operation on the wide width winding portion 21 can be automatized, the winding on the narrow width winding portion 21 cannot be automatized. Accordingly, the winding of the optical fiber 11 on the narrow width winding portion 21 is a big problem with respect to labor-saving in the winding process in regard to the overall automation of the optical fiber winding, and productivity improvement.

In addition, in the above, the case where both of the first winding portion (narrow width winding portion) 21 having a very narrow width W1 and the second winding portion (wide width winding portion) 23 having a wider width W2 are formed on one bobbin 20 is described. However, even though the bobbin is a bobbin having only one winding portion, when the width of the winding portion is significantly narrow, the above-described problem occurs.

SUMMARY OF THE INVENTION

The present invention is made in consideration of the above-described circumstances, and an object thereof is to improve labor-saving and efficiency in a winding operation using a bobbin including a winding portion having a narrow width by automatizing the winding operation of an optical fiber with respect to a winding portion having the narrow width without requiring manual operation.

In the present invention, basically, it is found that a shape of a fixing tool for fixing and holding a terminal of an optical fiber by interposing the terminal to a flange portion outside a bobbin, that is, a shape of a member corresponding to the fixed plate 9 shown in FIG. 22 as described in the related art is changed in a way that is unlike the related art, and thus, a function easily and securely introducing the optical fiber to the winding portion having a narrow width can be applied to the fixing tool.

An optical fiber terminal fixing tool according to a first aspect of the present invention is for winding an optical fiber which is mounted on a rotating shaft of the optical fiber winding machine, and holds and fixes a terminal portion of a winding start side of the optical fiber to be wound between a first flange portion provided outside the optical fiber winding bobbin and the optical fiber terminal fixing tool, and includes: a disc-shaped substrate having a plate surface; a holding surface which is provided on the plate surface and interposes the terminal portion of the optical fiber between the holding surface and the first flange portion; and a protrusion which continues in a circumferential direction with a larger diameter than an outer diameter of the first flange portion in an outer circumferential portion on the plate surface while protruding toward the bobbin in a state where the fixing tool is mounted on the rotating shaft of the optical fiber winding machine.

A protruded height of the protrusion from an extension surface of the holding surface may be larger than a thickness of the first flange portion.

A cross-sectional shape of the protrusion in a radial direction of the disc-shaped substrate may have an approximately triangular shape.

A second aspect of the present invention is an aspect with respect to a winding method of an optical fiber using the above-described optical fiber terminal fixing tool.

An optical fiber winding method according to a second aspect of the present invention, includes: preparing the above-described optical fiber terminal fixing tool for winding an optical fiber, and a bobbin in which the first winding portion is formed so as to be partitioned between the first flange portion and a second flange portion provided so as to be separated from the first flange portion; interposing and fixing the terminal portion of the winding start side of the optical fiber between the holding surface and the first flange portion, and moving a portion of the optical fiber to the bobbin by the protrusion; and crossing a portion of the optical fiber over the first flange portion by integrally rotating the optical fiber terminal fixing tool and the bobbin, and winding the optical fiber around the first winding portion.

A bobbin having an introduction groove cut into the inner side from the outer circumferential edge of the first flange portion may be used as the bobbin; and the process of integrally rotating the optical fiber terminal fixing tool and the bobbin may include engaging a portion of the optical fiber with the side edge of the introduction groove and passing the portion of the optical fiber through the inner portion of the introduction groove.

The dimensions of each portion of the bobbin and the optical fiber terminal fixing tool are defined as follows as the bobbin and the optical fiber terminal fixing tool, A: the width of the first winding portion of the bobbin B: the thickness of the first flange portion of the bobbin C1: the height of the first flange portion of the bobbin C2: the depth of the introduction groove of the first flange portion of the bobbin R: the radius of curvature of the chamfer portion when the side edge of the introduction groove is chamfered D: the height from an extension surface of the holding surface to an apex of the protrusion in the optical fiber terminal fixing tool E: the distance from the outer circumferential edge of the first flange portion to the apex of the protrusion in a radial direction of the bobbin and the optical fiber terminal fixing tool L: the distance between the first flange portion and the second flange portion in a direction parallel to the rotating shaft of the bobbin Here, the bobbin and the optical fiber terminal fixing tool, in which the dimensions of each portion satisfy the following Expression (1), Expression (2), and Expression (3), may be prepared.

[Math. 1]
$$\frac{C_2}{B-R} < \frac{H-(C_1-C_2)}{B+L} \tag{1}$$

[Math. 2]
$$\frac{C_2+E}{D} < \frac{C_2}{B-R} \tag{2}$$

[Math. 3]
$$D < A+B \tag{3}$$

As the bobbin, a bobbin may be prepared, which further includes a third flange portion, and in which the first flange portion and the third flange portion are formed on both end sides of the bobbin in a direction along a rotation axis, the second flange portion is formed between the first flange portion and the third flange portion, the first winding portion is formed between the first flange portion and the second flange portion, a second winding portion is formed between the second flange portion and the third flange portion, and the width in a direction along the rotation axis of the first winding portion is determined to be narrower than the width in the direction along the rotation axis of the second winding portion.

In the aspects of the present invention, as the bobbin, a bobbin in which an outer diameter of the first flange portion is smaller than an outer diameter of the second flange portion may be prepared.

According to the optical fiber terminal fixing tool according to the first aspect of the present invention, when the winding of the optical fiber on the bobbin starts, not only in the case where the terminal of the winding start side of the optical fiber is interposed and held to the outer surface side of the flange portion of the bobbin, but also in the case where the bobbin includes the winding portion having a narrow width, the optical fiber can be securely and easily introduced to the winding portion having a narrow width. In addition, according to the winding method of the second aspect of the present invention, by performing the winding using the optical fiber terminal fixing tool, the winding operation of the optical fiber with respect to the winding portion having a narrow width can be automized without requiring manual operation, and accordingly, labor-saving and efficiency can be improved in a winding operation using a bobbin including a winding portion having a narrow width.

Moreover, in the aspects of the present invention, the optical fiber terminal fixing tool has a function (for example, the function of the lateral movement member in the related art, or the like) of a winding starting assistance member when the winding starts. Accordingly, a space for separately disposing the winding start assistance member can be omitted, and thus, space saving in the vicinity of the winding machine is also achieved, and it is not necessary to move the winding assistance member again after the winding start end is fixed. Therefore, the time required to start the winding with respect to the winding portion can be decreased.

DETAILED DESCRIPTION OF THE INVENTION

Hereinafter, an embodiment of the present invention will be described in detail.

Figure 1:
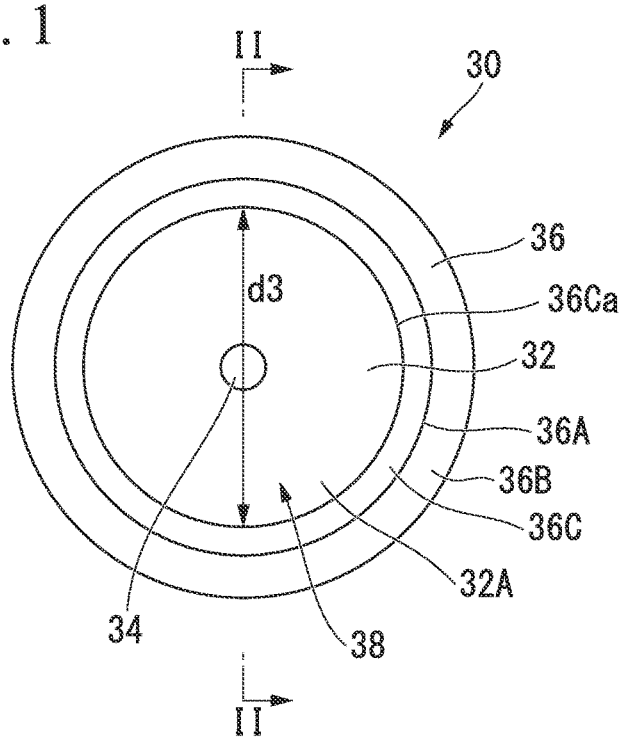
FIG. 1 is a right side view showing an optical fiber terminal fixing tool according to an embodiment of the present invention.
Figure 2:
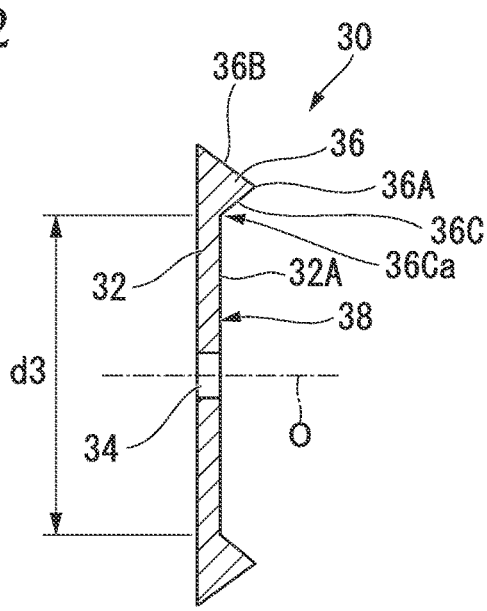
FIG. 2 is a cross-sectional view taken along line II-II of FIG. 1.

FIGS. 1 and 2 show the overall configuration of an optical fiber terminal fixing tool according to an embodiment of the present invention.

In FIGS. 1 and 2, for example, an optical fiber terminal fixing tool 30 is configured of a substrate (disc-shaped substrate) 32 formed in a disc shape as a whole by a relatively hard resin such as ABS resin or a metal such as aluminum. A shaft hole 34, through which a rotating shaft (not shown) of a winding machine is inserted, is formed on a center portion of the disc-shaped substrate 32 so as to penetrate along a central axis O. Moreover, an annular protrusion 36 protruding in a direction parallel to the central axis O is formed on a portion close to an outer circumferential edge on one plate surface 32A of the disc-shaped substrate 32.

The protrusion 36 continues along the circumferential direction of the disc-shaped substrate 32. A cross-sectional shape in a radial direction of the disc-shaped substrate 32 in the protrusion 36 has a triangular shape in which both sides of an apex (a location having a maximum protrusion position) 36A have inclined surfaces 36B and 36C, or a shape similar to the triangular shape. That is, the cross-section of the protrusion 36 has an outline of a triangular shape or the similar shape including the outer circumferential side inclined surface 36B which is inclined in a diameter decreasing direction from the outer circumferential edge of the disc-shaped substrate 32 toward the apex 36A, and the inner circumferential side inclined surface 36C which is inclined in a diameter increasing direction from the inner plate surface 32A of the disc-shaped substrate 32 toward the apex 36A. Here, the protrusion 36 is a portion which is in contact with the optical fiber, and thus, it is preferable that the surface of the protrusion be smooth such that the optical fiber is not damaged or hooked. Particularly, it is preferable that the apex 36A of the protrusion 36 have a chamfered shape so as to be a smooth arc shaped surface.

Additionally, the inner plate surface 32A in the disc-shaped substrate 32, that is, the plate surface 32A positioned on the same side as the side to which the protrusion 36 protrudes, faces a small-diameter outer flange portion (first flange portion) 25A of a bobbin 20 described below and becomes a holding surface 38 for fixing the winding start end portion of the optical fiber to be inserted between the plate surface 32A and the outer flange portion 25A. Here, preferably, for a material of the inner plate surface 32A rather than a material of the protrusion 36 in the disc-shaped substrate 32, a material of the disc-shaped substrate 32 is appropriately selected, or uses a material subjected to surface roughening treating or roughening processing. By performing the treating or processing, a flat surface having a friction coefficient of an extent to which the optical fiber terminal does not slide can be formed, and thus, the flat surface itself can serve the function of the holding surface 38. Alternatively, although it is not shown, a sheet-shaped buffer material having a high friction coefficient such as rubber adheres to the inner plate surface 32A, and thus, the holding surface 38 may be formed. In addition, when the sheet-shaped buffer material adheres to the inner plate surface 32A and the holding surface 38 is formed, the sheet-shaped buffer material does not necessarily adhere to the overall surface of the inner plate surface 32A. The sheet-shaped buffer member may adhere to a portion of the inner plate surface 32A, and the sheet-shaped buffer member may be divided in a plurality of members, adhere to a plurality of locations of the inner plate surface 32A, and thus, a plurality of holding surfaces 38 may be formed.

Here, in the present embodiment, the reason why the cross-sectional shape of the protrusion 36 in the radial direction has a triangular shape or the similar shape (approximately triangular shape) will be described below based on a relationship between the protrusion and the bobbin 20 shown in FIGS. 3 and 4.

The inner circumferential side inclined surface 36C of the protrusion 36 has an effective function which does not apply strong bending to the optical fiber holding the terminal and does not damage the optical fiber. If the portion corresponding to the inner circumferential side inclined surface 36C is formed in a step shape, the optical fiber is pressed to a corner of the step, is abruptly bent, and is rubbed by the corner of the step, and thus, there is a concern that the optical fiber may be damaged.

Meanwhile, even when a travel track of the optical fiber is somewhat deviated, the outer circumferential side inclined surface 36B has an effective function which does not lose the optical fiber and winds the optical fiber around the first winding portion (narrow width winding portion) 21. If the location corresponding to the outer circumferential side inclined surface 36B is a surface (or an inclined surface having a direction opposite to FIG. 2) perpendicular to the plate surface of the disc-shaped substrate 32, there is a concern that the optical fiber is wound on the outer circumference of the disc-shaped substrate 32 or around a member (on the outer circumference of the optical fiber terminal fixing tool 30 or the winding machine side) provided on the side opposite to the bobbin.

Moreover, as described below, in the optical fiber terminal fixing tool 30, the holding surface 38 needs to come in close contact with the outer surface (flat surface) of the first outer flange portion 25A of the bobbin 20, and the protrusion 36 is formed at a position positioned at the outer circumferential side of the outer edge of the first flange portion 25A. That is, a diameter d3 of a base end (start location) 36Ca of the inner circumferential side inclined surface 36C in the protrusion 36 is larger than a diameter d1 (refer to FIG. 4) of the first outer flange portion 25A of the first winding portion (narrow width winding portion) 21. That is, when the holding surface 38 approaches the first outer flange portion 25A of the bobbin 20, the protrusion 36 is formed so that the holding surface does not interfere with the outer surface of the first flange portion 25A. However, in order to easily introduce the optical fiber, it is preferable that the diameter d3 of the base end 36Ca of the inner circumferential side inclined surface 36C be close to the diameter d1 of the first outer flange portion 25A of the first winding portion 21.

Moreover, when the apex 36A of the protrusion 36 is too remote from the first outer flange portion 25A of the first winding portion (narrow width winding portion) 21, as described with respect to the dimensional relationship of each portion below, there is a concern that the inclination of the optical fiber may be insufficient to cross over the first flange portion 25A. On the other hand, if the apex 36A of the protrusion 36 abuts the first flange portion 25A, the optical fiber is pinched between the protrusion 36 and the first flange portion 25A, and the winding cannot be smoothly advanced, and thus, there is a concern that the optical fiber may be damaged or may be bent. Accordingly, preferably, the height of the apex (the location having a maximum height) 36A of the protrusion 36 (height from an extension surface of the holding surface 38) is larger than the thickness of the first outer flange portion 25A of the bobbin 20 and is determined so as not to come into contact with the first flange portion 25A. In this way, preferably, the dimensions of each portion of the optical fiber terminal fixing tool 30 are approximately determined according to the dimensions of each portion of the bobbin 20, and the details thereof will be described below.

Figure 3:
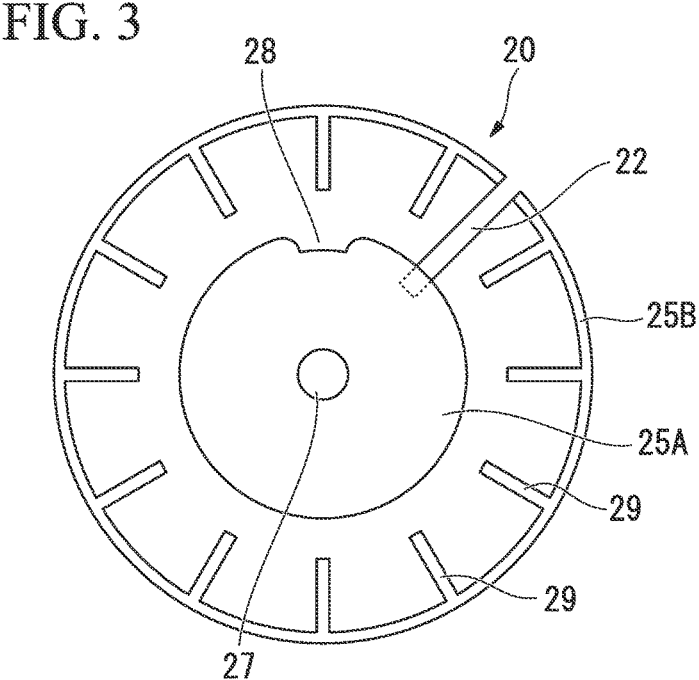
FIG. 3 is a left side view showing an example of a bobbin which is used in combination with the optical fiber terminal fixing tool shown in FIGS. 1 and 2.
Figure 4:
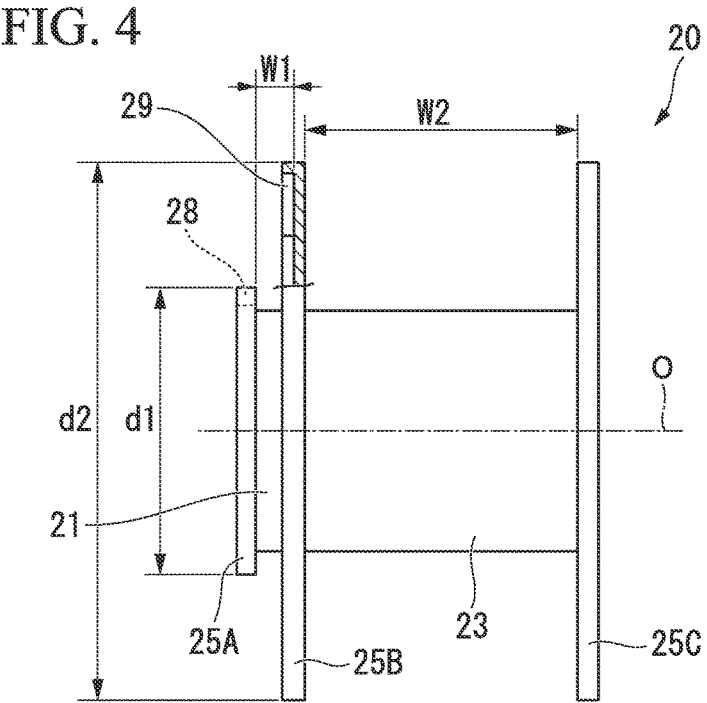
FIG. 4 is a partially cut front view of the bobbin shown in FIG. 3.

FIGS. 3 and 4 show an example of the bobbin 20 for winding the optical fiber used in combination with the optical fiber terminal fixing tool 30 shown in FIGS. 1 and 2. FIG. 3 is a left side view of the bobbin 20, and FIG. 4 is a front view of the bobbin 20.

Figure 24:
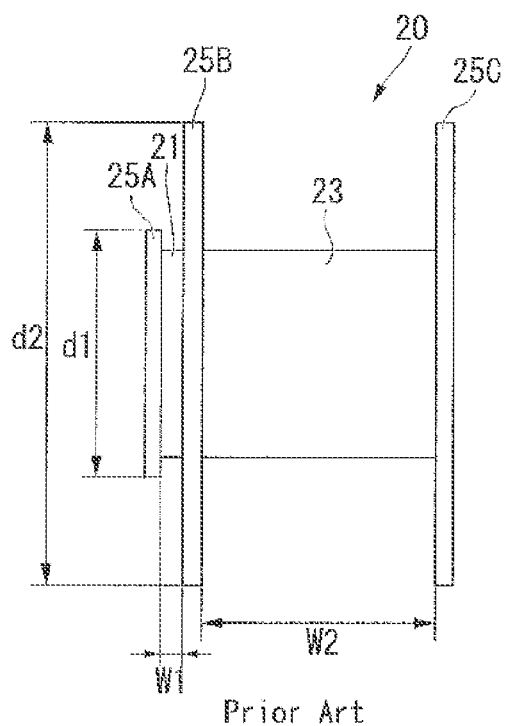
FIG. 24 is a schematic front view showing an example of the bobbin used in winding of the optical fiber.
Figure 25:
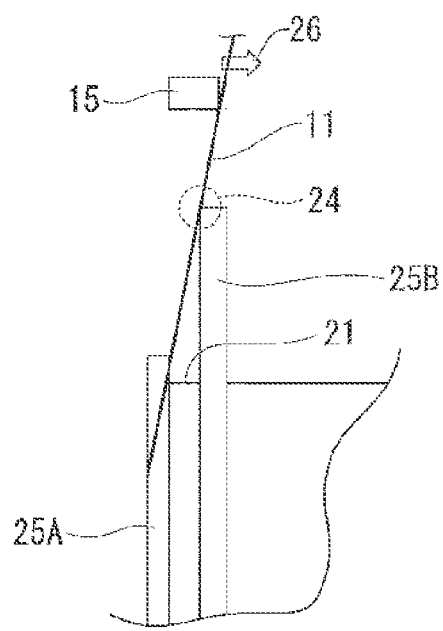
FIG. 25 is a schematic view showing a situation when the vicinity of a winding start end of the optical fiber is wound around the bobbin shown in FIG. 24 according to the method of the related art.

As shown in FIG. 24, basically, in the bobbin 20, the narrow width winding portion (first winding portion) 21, in which a width W1 in a direction along a central axis (rotation axis) O is narrow, is formed between the small diameter outer flange portion (first flange portion) 25A in which the diameter is d1 and the large diameter intermediate flange portion (second flange portion) 25B in which the diameter is d2. Moreover, the width winding portion (second winding portion) 23, in which a width W2 in a direction along the rotation axis is wide, is formed between the intermediate flange portion (second flange portion) 25B and the large diameter outer flange portion (third flange portion) 25C in which the diameter is d2. Moreover, similar to a general bobbin, a shaft hole 27 through which the rotating shaft (winding shaft) of the winding machine is inserted is formed. In addition, in the bobbin 20 of the present example, a slit 22 cut into the inner side from the outer circumferential side is formed on both large diameter flange portions (second flange portion 25B and third flange portion 25C) of the wide width winding portion (second winding portion) 23. In addition, in the bobbin 20 of the present embodiment, a plurality of ribs 29 for reinforcement are provided on outer surface sides of both large flange portions (second flange portion 25B and third flange portion 25C) of the wide width winding portion (second winding portion) 23. The ribs 29 are not essential. However, it is preferable that the ribs be provided to compensate for a decrease of strength according to a reduction in the weight and thickness of the flange portion.

Figure 5:
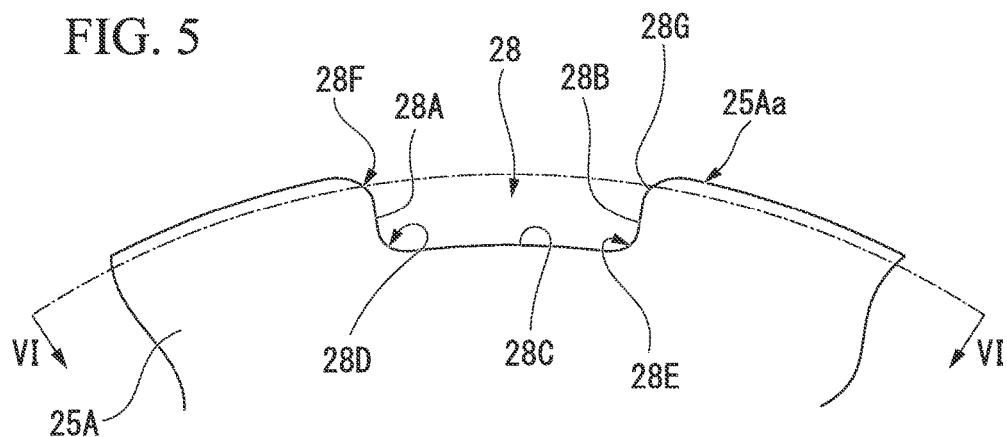
FIG. 5 is a left side view showing the vicinity of an introduction groove in a first flange portion outside the bobbin shown in FIG. 3, in an enlarged manner.
Figure 6:
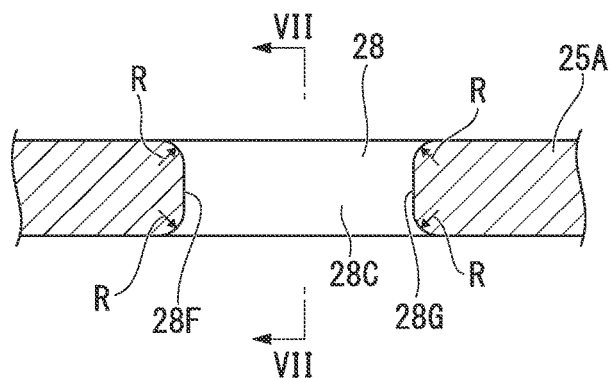
FIG. 6 is a cross-sectional view taken along line VI-VI of FIG. 5.
Figure 7:
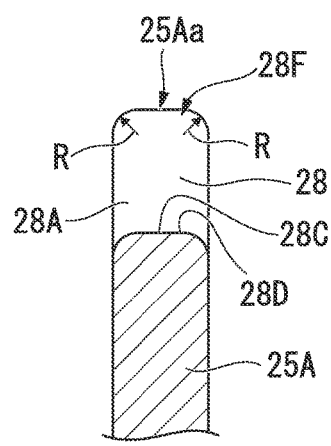
FIG. 7 is a cross-sectional view taken along line VII-VII of FIG. 6.

Moreover, an introduction groove 28, which is cut into the inner side in the radial direction from the outer circumferential edge surface 25Aa, is formed at a predetermined location of the first outer flange portion 25A in the axial direction of the first winding portion 21 having a narrow width in the bobbin 20. The details of the introduction groove 28 are shown in FIGS. 5 to 7. Moreover, similar to FIG. 3, FIG. 5 shows the vicinity of the introduction groove 28 in the left side surface of the bobbin 20 in an enlarged manner. FIG. 6 is a cross-sectional view taken along line VI-VI of FIG. 5, and FIG. 7 is a cross-sectional view taken along line VII-VII of FIG. 6.

As shown in FIG. 5, when viewed from the direction along the rotation axis of the bobbin 20, boundary regions 28D and 28E between both side edge portions 28A and 28B of the introduction groove 28 and a bottom edge portion 28C are formed in smooth curved shapes. Moreover, similarly, boundary regions 28F and 28G between a circumferential surface shaped outer circumferential edge surface 25Aa of the outer flange portion 25A and the side edge portions 28A and 28B of the introduction groove 28 are formed in smooth curved shapes.

Moreover, as shown in FIGS. 6 and 7, when viewed from a cross-section parallel to the thickness direction, in portions from the outer circumferential edge surface 25Aa of the outer flange portion 25A to the outer circumferential edge surface 25Aa of the outer flange portion 25A via the boundary region 28F, the side edge portion 28A, the boundary region 28D, the bottom edge portion 28C, the boundary region 28E, the side edge portion 28B, and the boundary region 28G in the introduction groove 28, the corners of the portions are chamfered by a radius of curvature R. Moreover, also in portions other than the introduction groove 28 in the outer circumferential edge surface 25Aa of the outer flange portion 25A, preferably, the corners of the cross-sections of the portions in the thickness direction are chamfered.

Moreover, as described below, the above-described introduction groove 28 is not necessarily essential. The outer circumferential edge of the flange portion 25A may be a simple cylindrical surface shape which does not have the introduction groove. Here, it is described such that the introduction groove 28 is provided.

A method for winding the optical fiber 11 around the bobbin 20 shown in FIGS. 3 to 7 using the optical fiber terminal fixing tool 30 shown in FIGS. 1 and 2 is described with reference to FIGS. 8 to 11. Particularly, a method for fixing the winding start end of the optical fiber 11 by the optical fiber terminal fixing tool 30 and for winding the optical fiber on the first winding portion (narrow width winding portion) 21 of the bobbin 20 is described. In addition, in the description below, the optical fiber terminal fixing tool 30 may be referred to as a fixing tool 30.

Figure 8:
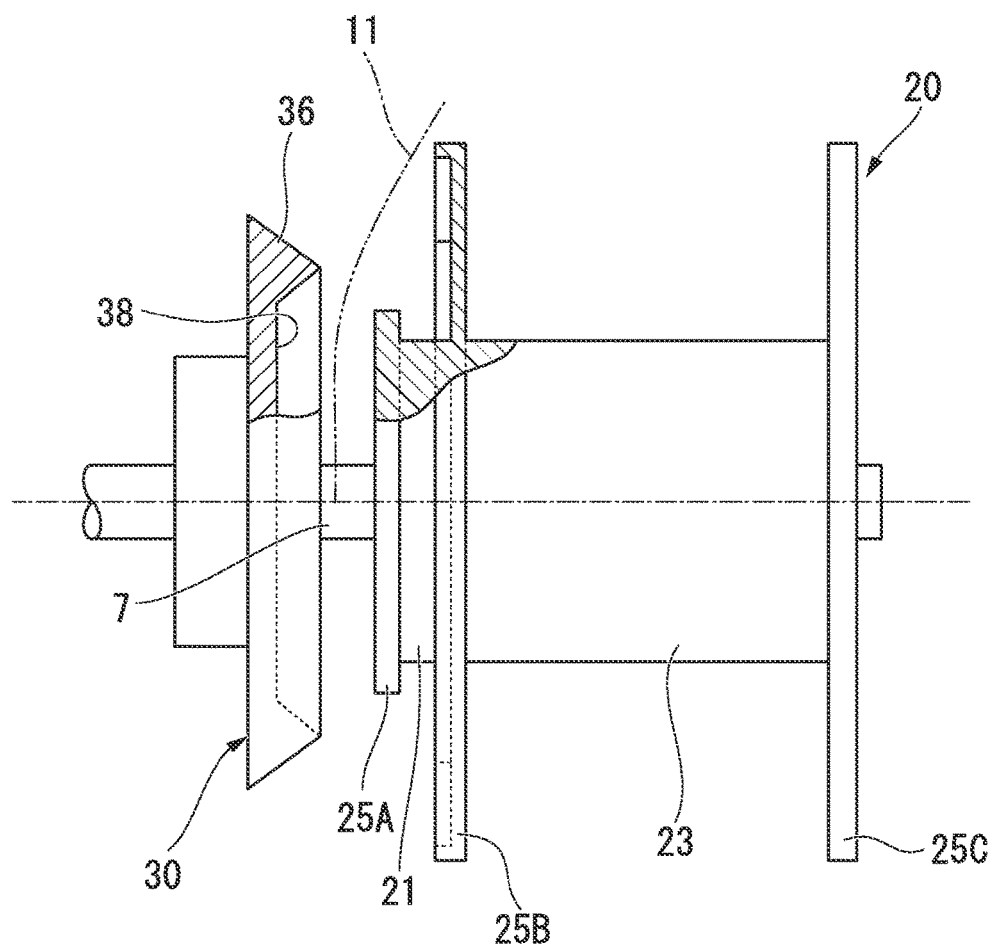
FIG. 8 is a partially cut front view showing a step before a winding start side terminal of an optical fiber is fixed when the bobbin shown in FIGS. 3 and 4 is combined with the optical fiber terminal fixing tool and winding of the optical fiber starts.

First, as shown in FIG. 8, the optical fiber terminal fixing tool 30 is mounted on a rotating shaft (winding shaft) 7 of the winding machine so as to integrally rotate with the rotating shaft 7. Moreover, the bobbin 20 is mounted on the rotating shaft (winding shaft) 7 of the winding machine so that the outer surface of the first outer flange portion 25A opposes the plate surface (holding surface 38) of the disc-shaped substrate 32 in the fixing tool 30. Moreover, before or after the bobbin 20 is mounted, the terminal portion of the optical fiber 11 to be wound is set (drops) to be positioned between the holding surface 38 of the fixing tool 30 and the first flange portion 25A of the bobbin 20.

Figure 9:
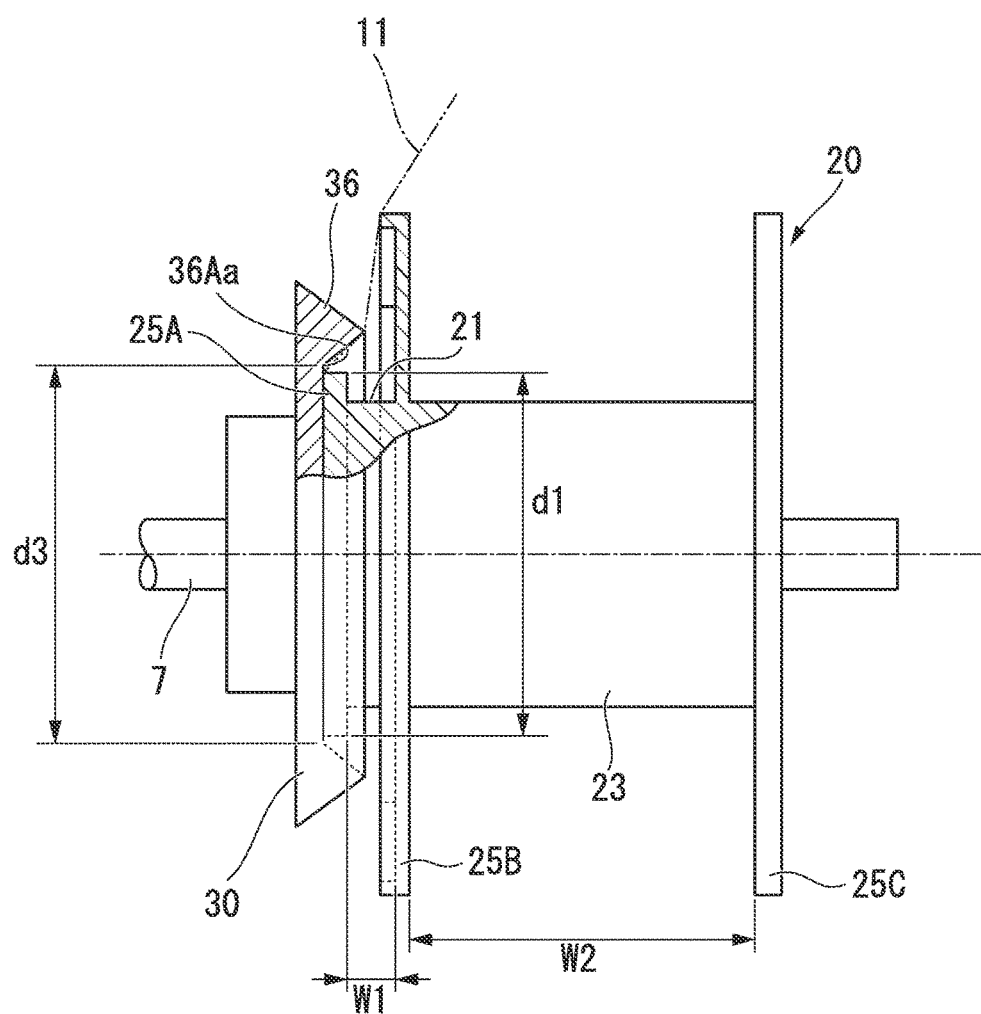
FIG. 9 is a partially cut front view showing a step, in which the winding start side terminal of the optical fiber is fixed, following the step of FIG. 8.

Subsequently, as shown in FIG. 9, the fixing tool 30 moves to a position at which the first flange portion 25A of the bobbin 20 is in contact with the holding surface 38 of the fixing tool 30. Subsequently, the first flange portion 25A is pressed to the holding surface 38, the terminal portion of the optical fiber 11 to be wound is inserted between the holding surface 38 of the fixing tool 30 and the outer flange portion 25A of the bobbin 20, and thus, the terminal portion of the optical fiber 11 is fixed and held. Moreover, preferably, the bobbin 20 is pressed to the holding surface 38 of the fixing tool 30 so that the optical fiber 11 does not slide even when winding tension is applied. Accordingly, preferably, the force for pressing the bobbin 20 to the holding surface 38 is appropriately determined according to a static friction coefficient between the holding surface 38 of the fixing tool 30 and the flat surface of the first flange portion 25A of the bobbin 20 and the optical fiber 11, and the length of the optical fiber 11 interposed therebetween.

Figure 10:
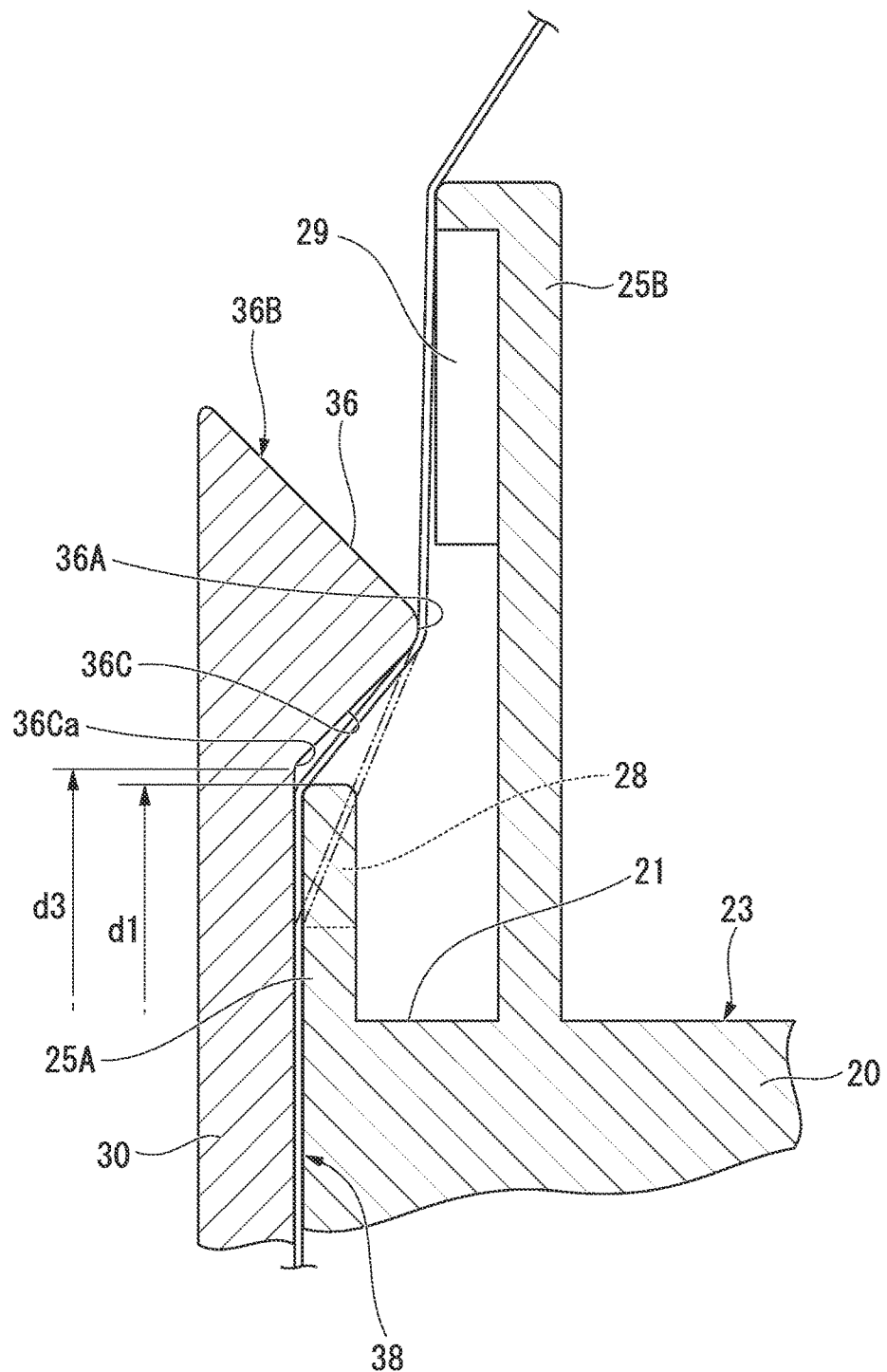
FIG. 10 is a cross-sectional view showing a main portion of FIG. 8 in an enlarged manner.

In this way, the terminal portion of the optical fiber 11 is inserted between the holding surface 38 of the fixing tool 30 and the first outer flange portion 25A of the bobbin 20. Moreover, at the same time, as shown in FIGS. 9 and 10, the optical fiber 11 is pushed toward the second flange portion (intermediate flange portion) 25B of the bobbin 20 by the protrusion 36 of the fixing tool 30. That is, the diameter d3 of the base end (start location) 36Ca of the inner circumferential side inclined surface 36C in the protrusion 36 of the fixing tool 30 is larger than the diameter d1 of the first flange portion 25A of the bobbin 20, and the protrusion 36 is positioned at the outer circumferential side of the outer edge of the first flange portion 25A. Moreover, the protrusion 36 protrudes (projects) toward the second flange portion (intermediate flange portion) 25B, and thus, the optical fiber 11 is pushed toward the second flange portion 25B by the protrusion 36.

Subsequently, if the bobbin 20 is rotated in the winding direction, the optical fiber 11 crosses over the first outer flange portion 25A of the bobbin 20 and is introduced to the first winding portion (narrow width winding portion) 21.

Figure 11A:
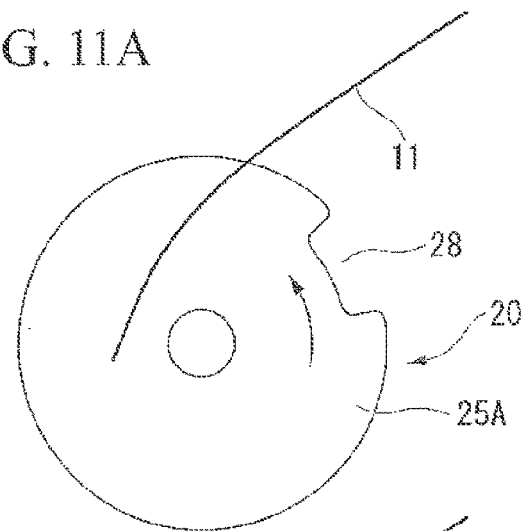
FIGS. 11A, 11B and 11C are schematic views from the left surface side showing a situation where the optical fiber is introduced to an introduction groove when the bobbin is rotated, in a stepwise manner, following the step of FIG. 9.
Figure 11B:
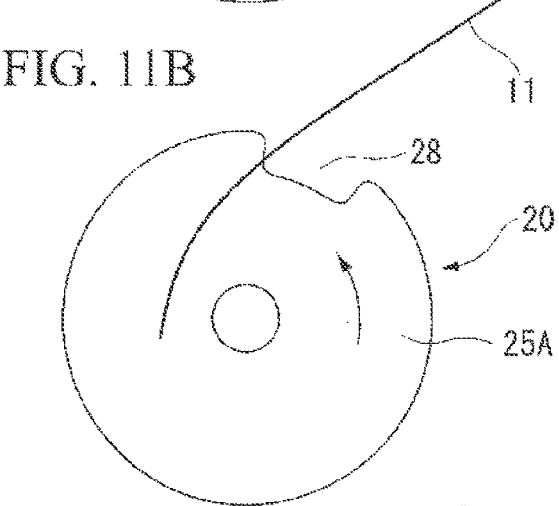
Figure 11C:
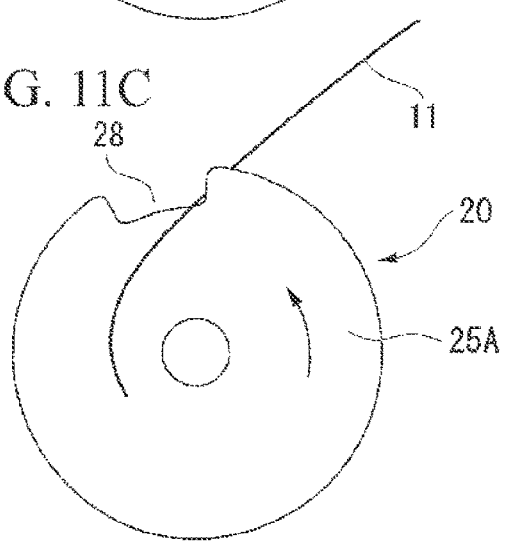

Here, when the bobbin 20, in which the introduction groove 28 is formed on the first flange portion 25A, is used, as shown in FIGS. 11A, 11B and 11C, the bobbin 20 is rotated (the rotation direction is indicated by an arrow) in the winding direction, and thus, a portion of the optical fiber 11 pressed toward the first flange portion 25A by the protrusion 36 is caught on the introduction groove 28. If the bobbin 20 is further rotated, the optical fiber 11 crosses over the outer flange portion 25A through the inner portion of the introduction groove 28 and is smoothly introduced to the inner side of the outer flange portion 25A, that is, the first winding portion (narrow width winding portion) 21.

Moreover, the introduction groove 28 is formed as an auxiliary for allowing the optical fiber 11 to cross easily over the first outer flange portion 25A of the bobbin. Accordingly, even when the introduction groove 28 is not provided, that is, even when the outer circumferential edge of the first flange portion 25A has a uniform circumferential surface, if the fixing tool 30 having the protrusion 36 is used, the optical fiber 11 is pushed by the protrusion 36, and thus, the optical fiber 11 can cross over the first flange portion 25.

However, in this case, after the optical fiber 11 is wound around the outer circumference edge surface of the first flange portion 25A at a fixed length, the fixed length drops on the first winding portion (narrow width winding portion) 21 inside the first flange portion 25A all at once, and the winding starts at the winding portion 21. Accordingly, it takes time for the optical fiber 11 to cross over the first flange portion 25, and there are some concerns that winding errors may occur. Accordingly, it is preferable that the introduction groove 28 be formed on the first outer flange portion 25A of the bobbin.

In addition, even when the introduction groove 28 is formed, at the time of the rotation start of the bobbin 20, in a case where the winding start end of the held optical fiber 11 and the introduction groove 28 are separated in the winding rotation direction, before the introduction groove 28 reaches the position of the optical fiber 11, the optical fiber 11 is wound around the outer circumferential edge surface of the first flange portion 25A at a fixed length, and similar to the above-described case, the optical fiber 11 having the fixed length drops on the narrow width winding portion 21 inside the first flange portion 25A all at once, and thus, there is a concern that the winding may start at the first winding portion 21. However, compared to the case where the introduction groove 28 is not provided, there is less concern.

Next, a desirable dimensional relationship of each portion of the optical fiber terminal fixing tool 30 and the bobbin 20 will be described with reference to FIGS. 12 to 20.

Figure 12:
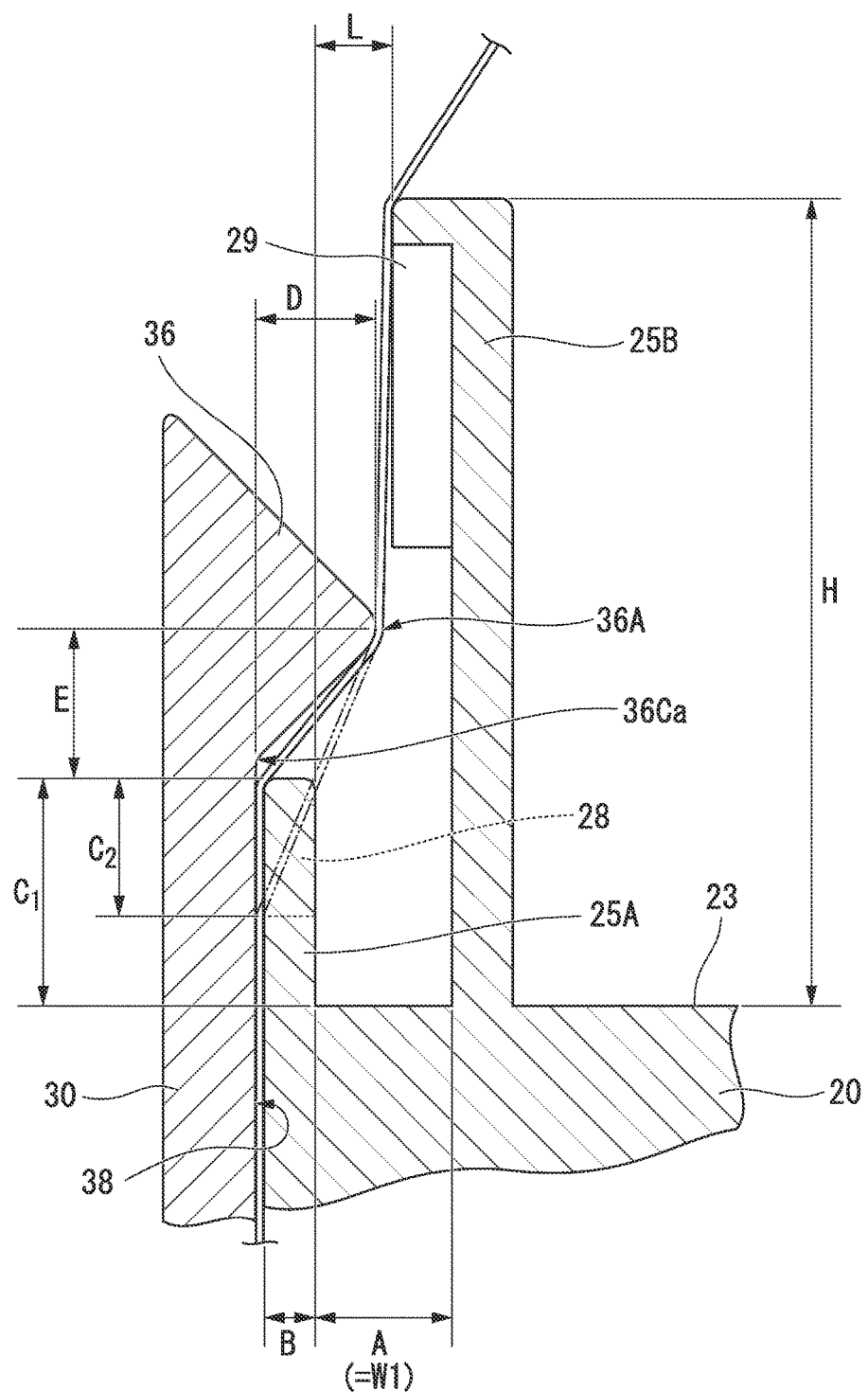
FIG. 12 is a schematic view showing a definition of dimensions of each portion of the optical fiber terminal fixing tool and the bobbin, in the same position as FIG. 10.

As shown in FIG. 12, a symbol indicating the dimensions of each portion is as follows.

A: the width (=W1) of the first winding portion (narrow width winding portion) 21

B: the thickness of the first outer flange portion 25A of the first winding portion (narrow width winding portion) 21

C1: the height of the first outer flange portion 25A of the first winding portion (narrow width winding portion) 21

Figure 16:
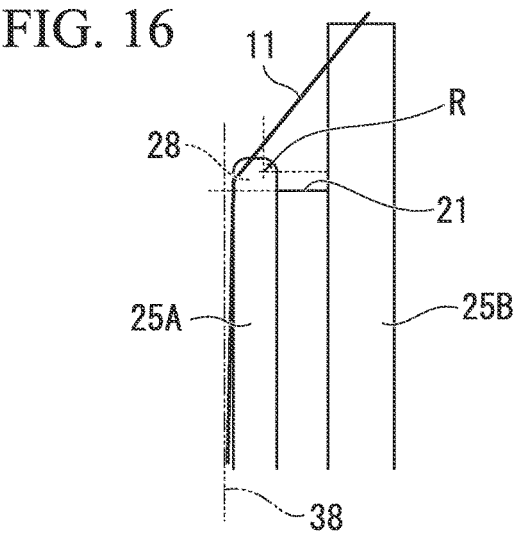
FIG. 16 is an explanatory view for deriving a desirable dimensional relationship of each portion of the optical fiber terminal fixing tool and the bobbin of the present invention and is a first explanatory view showing a situation when a method of the related art is applied in a case where the side edge of the introduction groove is chamfered.
Figure 17:
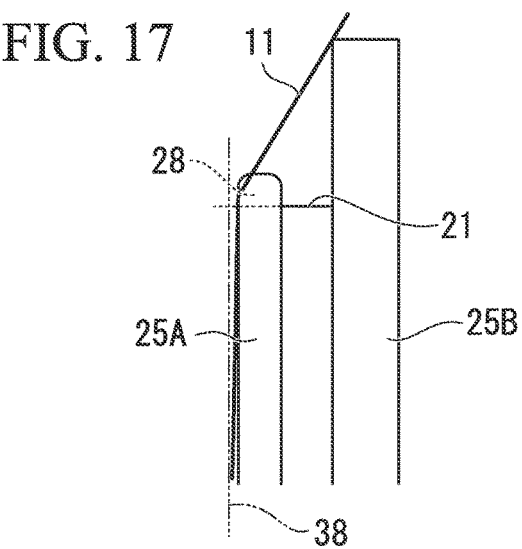
FIG. 17 is a second explanatory view with respect to the situation similar to FIG. 16.
Figure 18:
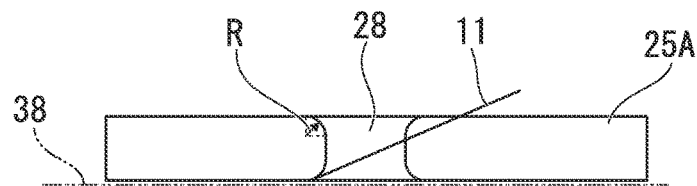
FIG. 18 is a third explanatory view with respect to the situation similar to FIG. 15.

C2: the depth of the introduction groove 28 formed on the first flange portion 25A R: the radius of curvature (refer to FIGS. 16 to 18: R=0 when the side edge is not chamfered) of the chamfered portion when the side edge of the introduction groove 28 is chamfered D: the height of the protrusion 36 of the fixing tool 30 (a height from an extension surface of the holding surface 38 to the apex 36A of the protrusion 36)

E: the distance from the outer circumferential edge of the first outer flange portion 25A of the first winding portion 21 to the apex 36A of the protrusion 36 in the radial direction of the bobbin 20 and the fixing tool 30

L: the gap (a gap between the inner surface of the first flange portion 25A and the surface of the outermost surface side of the second flange portion 25B including the rib 29 shown in FIG. 12 when the rib 29 is formed outside the second flange portion 25B) between the first flange portion 25A and the second flange portion (intermediate flange portion) 25B in the direction parallel to the rotating shaft of the bobbin 20

H: the height of the second flange portion (intermediate flange portion) 25B from the outer circumferential surface of the second winding portion (wide width winding portion) 23

Moreover, in FIG. 12, the depth C2 of the introduction groove 28 is smaller than the height C1 of the first flange portion 25A. However, the depth C2 of the introduction groove 28 may be the same as the height C1 of the first flange portion 25A. That is, C1=C2 may be satisfied.

As described above, the dimensions of each portion are defined, and it is assumed that the fixing tool (accordingly, the flat disc-shaped fixing tool similar to the related art; substantially, the fixing tool which has only the holding surface 38), which does not have the protrusion 36, is used. In addition, also in this case, after the terminal portion of the optical fiber is held, a relational expression of the bobbin dimensions, in which the optical fiber can be introduced to the winding portion, can be expressed by the following Expression (4). Moreover, here, it is assumed that the edges of the introduction groove 28 of the first flange portion 25A are not chamfered (that is, the radius of curvature of the chamfer=0 is satisfied).

[Math. 4]

$$\frac{C_2}{B} > \frac{H-(C_1-C_2)}{B+L} \quad (4)$$

Figure 14:
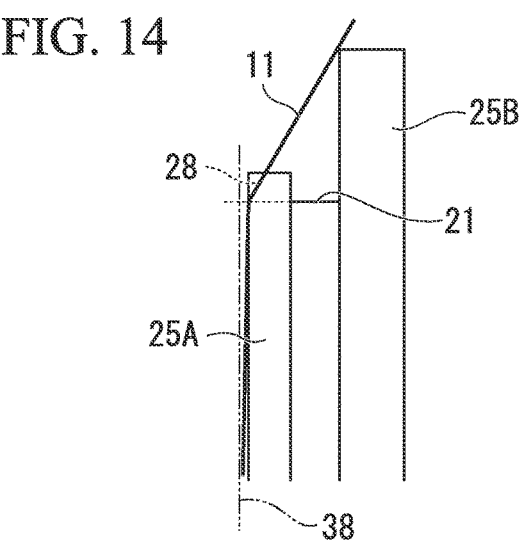
FIG. 14 is a second explanatory view with respect to the situation similar to FIG. 13.
Figure 15:
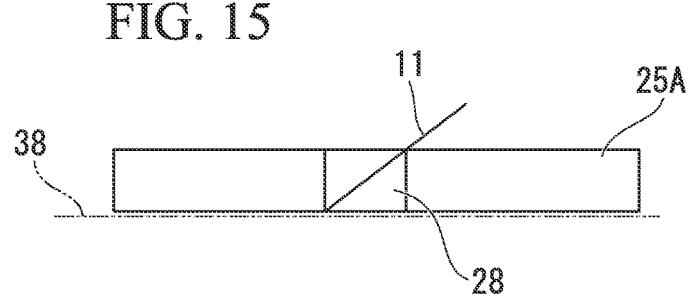
FIG. 15 is a third explanatory view with respect to the situation similar to FIG. 13.

Expression (4) will be described with reference to FIGS. 13 to 15. Moreover, in FIGS. 13 to 15, for simplification of explanation, the rib 29 of the first flange portion 25A is omitted. This is similarly applied to FIGS. 16 to 18 and 20 described below.

Figure 13:
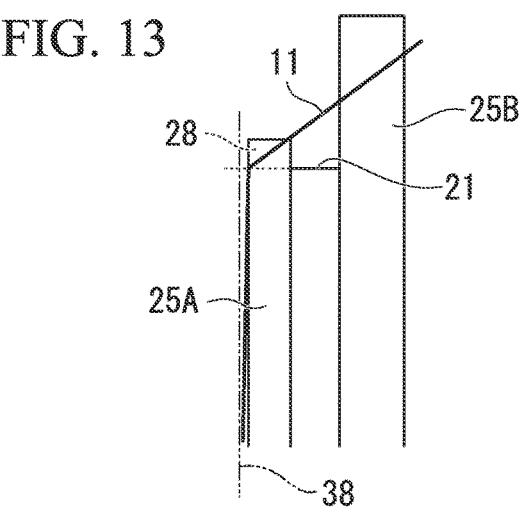
FIG. 13 is an explanatory view for deriving a desirable dimensional relationship of each portion of the optical fiber terminal fixing tool and the bobbin of the present invention, and is a first explanatory view showing a situation when a method of the related art is applied in a case where a side edge of the introduction groove is not chamfered.

As schematically shown in FIG. 13, the left side of Expression (4) indicates the inclination when the optical fiber 11 held to the holding surface 38 is stretched between the location (the edge which is not chamfered) of the holding surface 38 side of the bottom portion of the introduction groove 28 and the position (the edge of the side of the second flange portion 2513) of the outer circumferential edge of the first flange portion 25A. On the other hand, as schematically shown in FIG. 14, the right side of Expression (4) indicates the inclination when the optical fiber 11 is stretched from the holding surface 38 to the corner of the outer circumferential edge of the second flange portion 25B (the corner of the side of the first flange portion 25A) via the bottom portion of the introduction groove 28.

Figure 21:
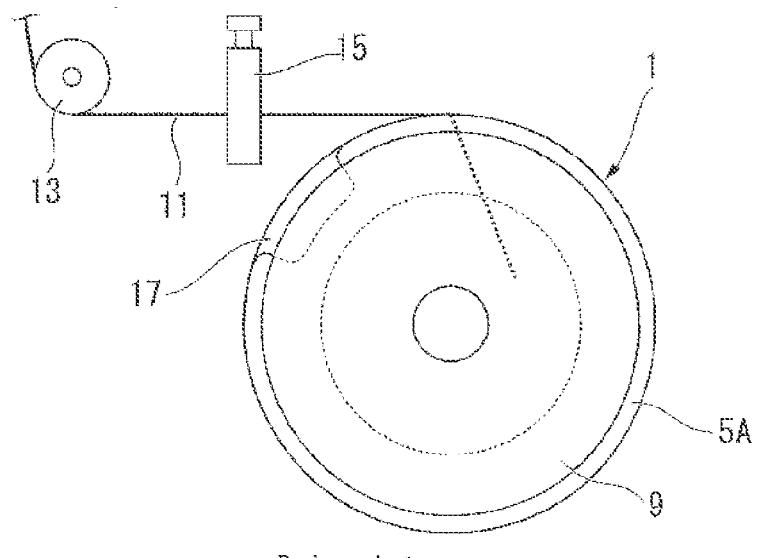
FIG. 21 is a left side view schematically showing an example of a method of the related art for introducing the vicinity of a winding start end of the optical fiber to the winding drum of the bobbin.
Figure 22:
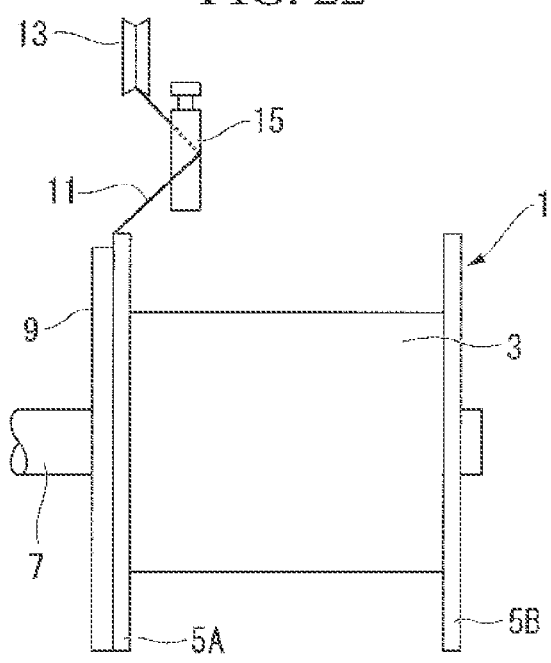
FIG. 22 is a schematic front view of FIG. 21.
Figure 23:
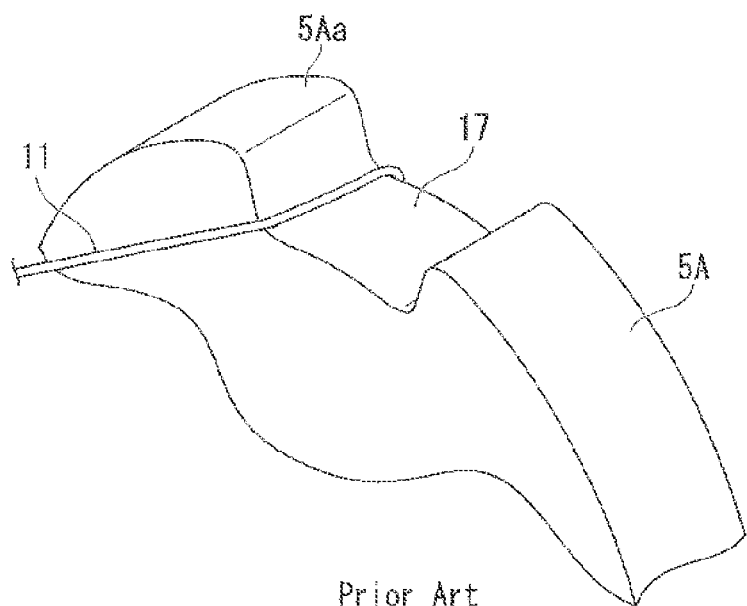
FIG. 23 is a perspective view showing an introduction groove of a flange portion when the method of the related art shown in FIG. 21 is performed.

Here, when the left side is larger than the right side in Expression (4), if the optical fiber 11 is pushed into the bobbin 20 side by the lateral movement member (for example, indicated by the reference numeral 15 of FIGS. 21 and 22) of the related art until the optical fiber 11 comes into contact with the corner of the second flange portion 25B, the optical fiber 11 is caught over the introduction groove 28 and is introduced to the winding portion 21. At this time, when the introduction groove 28 is viewed from immediately above, the positional relationship between the bobbin 20 and the optical fiber 11 becomes the situation shown in FIG. 15.

When the side edge of the introduction groove 28 is chamfered by the radius of curvature (or a distance from the edge end to the chamfer starting point) of R as shown in FIGS. 16 to 18, Expression (4) is transformed to Expression (5).

[Math. 5]

$$\frac{C_2}{B-R} > \frac{H-(C_1-C_2)}{B+L} \quad (5)$$

When the side edge of the introduction groove 28 is chamfered by the radius of curvature R, FIG. 16 shows the situation of the inclination of the optical fiber 11 indicated by the left side in Expression (5), and FIG. 17 shows the situation of the inclination of the optical fiber 11 indicated by the right side. When the side edge of the introduction groove 28 is chamfered as shown in FIGS. 16 to 18, if the optical fiber 11 is pressed to the chamfer location of the introduction groove 28, it is considered that the optical fiber 11 slides along the chamfered curve surface and is introduced to the winding portion 21. At this time, when the introduction groove 28 is viewed from immediately above, the positional relationship between the bobbin 20 and the optical fiber 11 becomes the state of FIG. 18.

As the above, the windable condition is described, in which the fixing tool, which does not have a characteristic of the protrusion 36 in the optical fiber terminal fixing tool 30 of the present embodiment, is used, and the winding is performed according to the method of the related art using the lateral movement member. However, if the fixing tool of the present embodiment having the protrusion 36 is used, conversely, when the condition is not satisfied, that is, even when the lateral movement member is used and the automatic winding is difficult, the winding can be performed. This means that the effects of the present embodiment are exerted even when Expression (4) or Expression (5) is not satisfied. Accordingly, the relational expression of the optimal bobbin dimensions when the present embodiment is applied is represented by the following Expression (6) (the same as the above-described Expression (1)). In addition, when the side edge of the introduction groove 28 is not chamfered, R=0 is satisfied in Expression (6).

[Math. 6]

$$\frac{C_2}{B-R} < \frac{H-(C_1-C_2)}{B+L} \quad (6)$$

Figure 19:
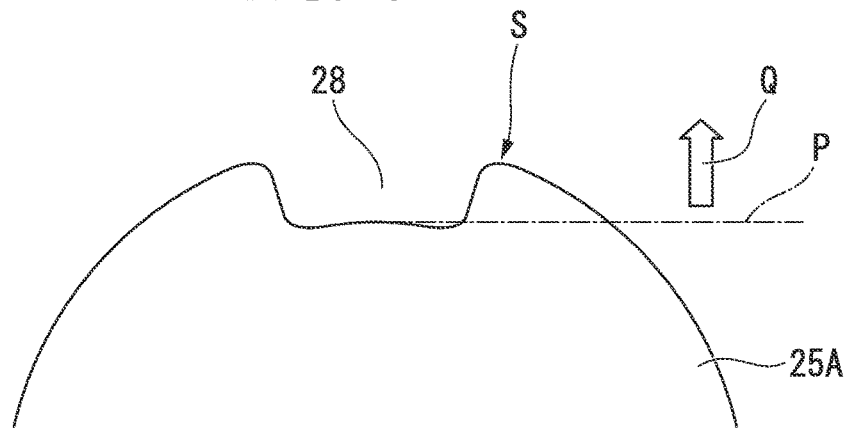
FIG. 19 is a schematic view for explaining the introduction groove.

Here, when the introduction groove 28 having the object for introducing the optical fiber 11 is used, the condition in which the optical fiber 11 is caught on the introduction groove 28 is required. As shown in FIG. 19, the condition is that the circumferential edge surface portion S of the flange portion in the end of the introduction groove 28 protrudes to the outer circumferential side (that is, to an arrow Q side with respect to a tangential track P) of the tangential track P of the optical fiber 11 which is caught on the introduction groove 28. If the introduction groove 28 has the shape satisfying the above-described condition, it is possible to hook the optical fiber 11 to the introduction groove 28.

When the introduction groove 28 satisfying the condition is used and the winding is performed using the fixing tool 30 having the protrusion 36, the optimal dimensional relationship of each portion of the fixing tool 30 and the bobbin 20 will be described below with reference to FIG. 20.

First, a condition in which the optical fiber 11 is introduced to the winding portion 21 over the introduction groove 28 is represented by the following Expression (7) (the same as Expression (2) described above)

[Math. 7]

$$\frac{C_2+E}{D} < \frac{C_2}{B-R} \quad (7)$$

Figure 20:
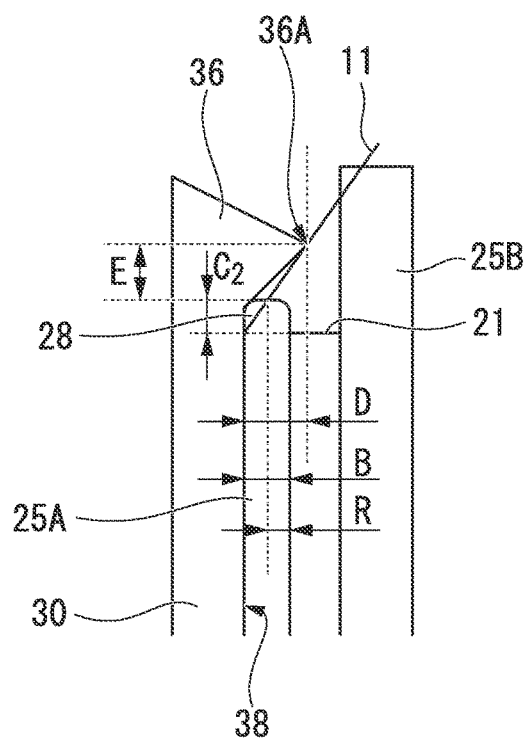
FIG. 20 is a schematic view showing the dimensional relationship of each portion of the optical fiber terminal fixing tool and the bobbin when the optical fiber is wound around the narrow width winding portion by the method of the present invention.

As shown in FIG. 20, the left side of Expression (7) indicates the inclination of the optical fiber 11 which is stretched to abut the apex 36A of the protrusion 36 of the fixing tool 30 via the bottom portion of the introduction groove 28 from the holding surface 38. Moreover, as shown in FIGS. 14 and 17, the right side of Expression (7) indicates the inclination of the optical fiber 11 which is stretched to come into contact with the boundary (the side of the first winding portion 21) at which the chamfer starts on the outer circumferential edge of the second flange portion (intermediate flange portion) 25B via the bottom portion of the introduction groove 28 from the holding surface 38.

The fact that the left side is smaller than the right side in Expression (7) meaning that the optical fiber 11 is pushed into the second flange portion 25B side by the tip (apex 36A) of the protrusion 36 of the fixing tool 30, and thus, the optical fiber 11 is introduced to the first winding portion (narrow width winding portion) 21 over the first outer flange portion 25A through the introduction groove 28.

However, if the tip of the protrusion 36 of the fixing tool 30 (apex 36A) completely crosses over the region of the first winding portion (narrow width winding portion) 21, since the tip of the protrusion 36 abuts the second flange portion 25B, it is preferable that the following Expression (8) (the same as Expression (3) described above) be satisfied.

[Math. 8]

$$D < A + B \quad (8)$$

Moreover, in consideration of Expression (8), Expression (7) can be represented by the following Expression (9).

[Math. 9]

$$\frac{C_2 + E}{D} < \frac{C_2}{B - R} \Leftrightarrow E(B - R) < C_2(D - B + R) < C_2(A + R) \quad (9)$$

Moreover, the bending of the optical fiber 11 is decreased as E is decreased in Expression (9) (the apex 36A of the protrusion 36 and the outer circumferential edge of the first flange portion 35A approach each other), and thus, a lower limit of E is determined by an allowable bending diameter of the optical fiber 11.

As described above, if the winding of the optical fiber is performed by combining the bobbin 20 and the optical fiber terminal fixing tool 30 having dimensions which satisfy each condition defined by Expressions (6), (7), and (8), in other words, each condition defined by Expression (1), (2), and (3), the optical fiber, in which the terminal is held and fixed between the holding surface of the fixing tool and the flange portion (first flange portion) outside the bobbin, can be securely and easily introduced to the narrow width winding portion. That is, the optical fiber, in which the terminal is fixed, can be automatically introduced to the narrow width winding portion according to the rotation of the bobbin when the winding starts. Accordingly, if appropriate programs are incorporated, the step, which performs the winding to the bobbin while fixing the winding start end of the optical fiber, can be automized.

In addition, in the case of the present embodiment, the portion (protrusion 36) for introducing the optical fiber is integrated with the optical fiber terminal fixing tool 30 mounted on the winding machine, and thus, particularly, an area occupied by the apparatus is not increased, and it is possible to perform the winding method of the present embodiment with a minimum amount of required occupied space.

Moreover, a preparation, which introduces the optical fiber to the winding portion, is completed by only interposing and fixing the winding start end of the optical fiber between the fixing tool 30 and the bobbin flange side surface. Accordingly, the apparatus does not need to be moved to introduce the optical fiber again after the winding start end is fixed, and the time required until the winding starts is not increased.

In addition, as described above, when the optical fiber 11 is continuously wound around the second winding portion 23 after the optical fiber 11 is wound around the first winding portion 21 having a narrow width, for example, the optical fiber 11 may be introduced from the first winding portion 21 to the second winding portion 23 through the slit 22 (refer to FIG. 3) formed on the second flange portion 25B, and accordingly, the transfer from the winding in the first winding portion 21 to the winding out of the second winding portion 23 can be also easily automized.

Using two kinds of bobbins A and B and one kind of optical fiber terminal fixing tool satisfying each above-described condition, testing with respect to the fixing (holding between the holding surface 38 of the fixing tool 30 and the first flange portion 35A of the bobbin 20) and the winding was performed.

The dimensions of each portion of the optical fiber terminal fixing tool of the tested two kinds of bobbins A and B and one kind of optical fiber terminal fixing tool are shown in the following Table 1. Moreover, the results, which verify that each dimension satisfies Expressions (1), (2), and (3), are shown in Table 2.

TABLE 1

| Portion | [mm] | Bobbin A | Bobbin B |
|---|---|---|---|
| First Winding Portion 21 of Bobbin 20 | Diameter | 154 | 170 |
|  | Width (A = W2) | 10 | 8 |
| First Flange Portion 25A Outside Bobbin 20 | Diameter (d1) | 170 | 194 |
|  | Thickness (B) | 2 | 2 |
|  | Height ($C_1$) | 8 | 12 |
| Introduction Groove 28 of First Flange Portion 25A of Bobbin 20 | Length (Opening) | 40 | 35 |
|  | Length (Bottom Portion) | 25 | 20 |
|  | Depth ($C_2$) | 8 | 12 |
|  | Chamfer (R) | 1 | 1 |
| Second Flange Portion (Intermediate Flange Portion) 25B of Bobbin 20 | Diameter (d2) | 230 | 270 |
|  | Height (H) | 40 | 50 |
|  | Distance (L) Between Second Flange Portion 25B and First Flange Portion 25A | 0 | 0 |
| Optical Fiber Terminal Fixing Tool 30 | Diameter (Diameter of Apex 36A of Protrusion 36) | 210 |  |
|  | Height (D) of Protrusion 36 | 4 |  |

TABLE 2

Expression (1)

$$\frac{C_2}{B - R} < \frac{H - (C_1 - C_2)}{B + L}$$

Bobbin A: [Left Side] $\frac{8}{2-1} = 8$ [Right Side] $\frac{40 - (8 - 8)}{2 + 0} = 20$ ∴ Left Side < Right Side Bobbin B: [Left Side] $\frac{12}{2-1} = 12$ [Right Side] $\frac{50 - (12 - 12)}{2 + 0} = 25$ ∴ Left Side < Right Side TABLE 2-continued

| Expression (2) |
|---|
| $\dfrac{C_2 + E}{D} < \dfrac{C_2}{B - R}$ |

| | | |
|---|---|---|
| Bobbin A: [Left Side] $\dfrac{8 + \dfrac{210 - 170}{2}}{4} = 7$ | [Right Side] $\dfrac{8}{2 - 1} = 8$ | ∴Left Side < Right Side |
| Bobbin B: [Left Side] $\dfrac{12 + \dfrac{210 - 194}{2}}{4} = 5$ | [Right Side] $\dfrac{12}{2 - 1} = 12$ | ∴Left Side < Right Side |

| Expression (3) |
|---|
| $D < A + B$ |

| | | |
|---|---|---|
| Bobbin A: [Left Side] 4 | [Right Side] 10 + 2 = 12 | ∴Left Side < Right Side |
| Bobbin B: [Left Side] 4 | [Right Side] 8 + 2 = 10 | ∴Left Side < Right Side |

The following test was performed, in which each of bobbins A and B was combined with each optical fiber terminal fixing tool, the terminal of the winding start side of the optical fiber was held and fixed between the holding surface 38 of the fixing tool and the first flange portion of the bobbin, and thereafter, the bobbin was rotated, and the optical fiber was introduced from the introduction groove to the first winding portion (narrow width winding portion) and was wound at a fixed length. Also in each case, the optical fiber could be smoothly wound around the first winding portion (narrow width winding portion).

Moreover, in the above-described each embodiment, the case where the optical fiber 11 is wound around the first winding portion (narrow width winding portion) 21 having a narrow width, using the bobbin 20 having the first winding portion (narrow width winding portion) 21 having a narrow width and the second winding portion (wide width winding portion) 23 having a wide width is described. However, even when the optical fiber is wound around the bobbin which has only the narrow width winding portion, the optical fiber terminal fixing tool of the present embodiment and the winding method of the present invention can be applied.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An optical fiber terminal fixing tool for winding an optical fiber which is mounted on a rotating shaft of an optical fiber winding machine, and holds and fixes a terminal portion of a winding start side of the optical fiber to be wound between a first flange portion provided outside an optical fiber winding bobbin and the optical fiber terminal fixing tool, comprising:
   a disc-shaped substrate having a plate surface;
   a holding surface which is provided on the plate surface and interposes the terminal portion of the optical fiber between the holding surface and the first flange portion; and
   a protrusion which continues in a circumferential direction with a larger diameter than an outer diameter of the first flange portion in an outer circumferential portion on the plate surface while protruding toward the bobbin in a state where the fixing tool is mounted on the rotating shaft of the optical fiber winding machine, wherein
   a cross-sectional shape of the protrusion in a radial direction of the disc-shaed substrate has an approximately triangular shape.

2. The optical fiber terminal fixing tool for winding an optical fiber according to claim 1, wherein
   a protruded height of the protrusion from an extension surface of the holding surface is larger than a thickness of the first flange portion.

3. An optical fiber winding method, comprising:
   preparing the optical fiber terminal fixing tool for winding an optical fiber according to claim 1, the optical fiber winding bobbin in which a first winding portion is formed so as to be partitioned between the first flange portion and a second flange portion provided so as to be separated from the first flange portion, and the optical fiber;
   interposing and fixing the terminal portion of the winding start side of the optical fiber between the holding surface and the first flange portion;
   moving a portion of the optical fiber to the optical fiber winding bobbin by means of the protrusion;
   crossing a portion of the optical fiber over the first flange portion by integrally rotating the optical fiber terminal fixing tool and the optical fiber winding bobbin; and
   winding the optical fiber around the first winding portion.

4. The optical fiber winding method according to claim 3, wherein
   the optical fiber winding bobbin having an introduction groove cut into the inner side from the outer circumferential edge of the first flange portion is used as the optical fiber winding bobbin; and
   the process of integrally rotating the optical fiber terminal fixing tool and the optical fiber winding bobbin includes engaging a portion of the optical fiber with the side edge of the introduction groove and passing the portion of the optical fiber through the inner portion of the introduction groove.

5. The optical fiber winding method according to claim 3, wherein
   dimensions of each portion of the optical fiber winding bobbin and the optical fiber terminal fixing tool are defined as follows for the bobbin and the optical fiber terminal fixing tool, A: a width of the first winding portion of the optical fiber winding bobbin
B: a thickness of the first flange portion of the optical fiber winding bobbin
C1: a height of the first flange portion of the optical fiber winding bobbin
C2: a depth of an introduction groove of the first flange portion of the optical fiber winding bobbin
R: a radius of curvature of a chamfer portion when the side edge of the introduction groove is chamfered
D: a height from an extension surface of the holding surface to an apex of the protrusion in the optical fiber terminal fixing tool
E: a distance from an outer circumferential edge of the first flange portion to the apex of the protrusion in a radial direction of the optical fiber winding bobbin and the optical fiber terminal fixing tool
L: a distance between the first flange portion and the second flange portion in a direction parallel to the rotating shaft of the optical fiber winding bobbin
H: the height of the second flange portion from the outer circumferential surface of the second winding portion
wherein the optical fiber winding bobbin and the optical fiber terminal fixing tool, in which the dimensions of each portion satisfy the following Expression (1), Expression (2), and Expression (3), are prepared $$\frac{C_2}{B-R} < \frac{H-(C_1-C_2)}{B+L} \qquad (1)$$

$$\frac{C_2+E}{D} < \frac{C_2}{B-R} \qquad (2)$$

$$D < A + B. \qquad (3)$$

6. The optical fiber winding method according to claim 3, further comprising:
preparing, as the optical fiber winding bobbin, a optical fiber winding bobbin which further includes a third flange portion, in which the first flange portion and the third flange portion are formed on both end sides of the optical fiber winding bobbin in a direction along a rotation axis, the second flange portion is formed between the first flange portion and the third flange portion, the first winding portion is formed between the first flange portion and the second flange portion, a second winding portion is formed between the second flange portion and the third flange portion, and a width in a direction along the rotation axis of the first winding portion is determined to be narrower than a width in the direction along the rotation axis of the second winding portion.

7. The optical fiber winding method according to claim 6, further comprising:
preparing, as the optical fiber winding bobbin, a optical fiber winding bobbin in which an outer diameter of the first flange portion is smaller than an outer diameter of the second flange portion.

* * * * *